United States Patent [19]
Hansen, Jr.

[11] 3,795,335
[45] Mar. 5, 1974

[54] MATERIAL HANDLING APPARATUS
[76] Inventor: Bobbie F. Hansen, Jr., 3693 N. Dickinson, Fresno, Calif. 93705
[22] Filed: Apr. 17, 1972
[21] Appl. No.: 244,479

[52] U.S. Cl.................. 214/304, 214/302, 214/519
[51] Int. Cl............................................. B65g 65/04
[58] Field of Search .... 214/300, 304, 305; 198/7 R; 221/70, 71, 72, 73

[56] References Cited
UNITED STATES PATENTS

| 2,935,217 | 5/1960 | Martin | 214/311 |
|---|---|---|---|
| 2,323,852 | 6/1943 | Seidel et al. | 214/311 |
| 1,945,758 | 2/1934 | Turner | 214/311 |
| 3,467,267 | 9/1969 | Van Elten | 214/305 |
| 3,664,530 | 5/1972 | Takiguchi | 214/305 |
| 624,023 | 5/1899 | Heine | 214/305 |
| 3,186,614 | 6/1965 | Wilkinson et al. | 214/305 |
| 3,650,876 | 3/1972 | Stageberg | 221/73 |

FOREIGN PATENTS OR APPLICATIONS

| 1,207,877 | 12/1965 | Germany | 214/305 |

Primary Examiner—Robert G. Sheridan
Assistant Examiner—Lawrence J. Oresky
Attorney, Agent, or Firm—Huebner & Worrel

[57] ABSTRACT

A material handling apparatus mounted in operable association with a source of containers, the apparatus having a frame; an endless belt providing opposite grasping and discharge ends and a lower run, mounted in the frame with the grasping end adjacent to the source and the lower run defining a path of travel away from the source; a plurality of container engaging tines mounted on and extending from the belt; a stripping mechanism mounted in the frame adjacent to the discharge end of the belt; and a source of power mounted in the frame adapted to drive the belt and stripping mechanism so that containers are successively impaled on the tines, drawn from the source of containers so as gravitationally to discharge their contents, and pulled from the tines by the stripping mechanism.

9 Claims, 3 Drawing Figures

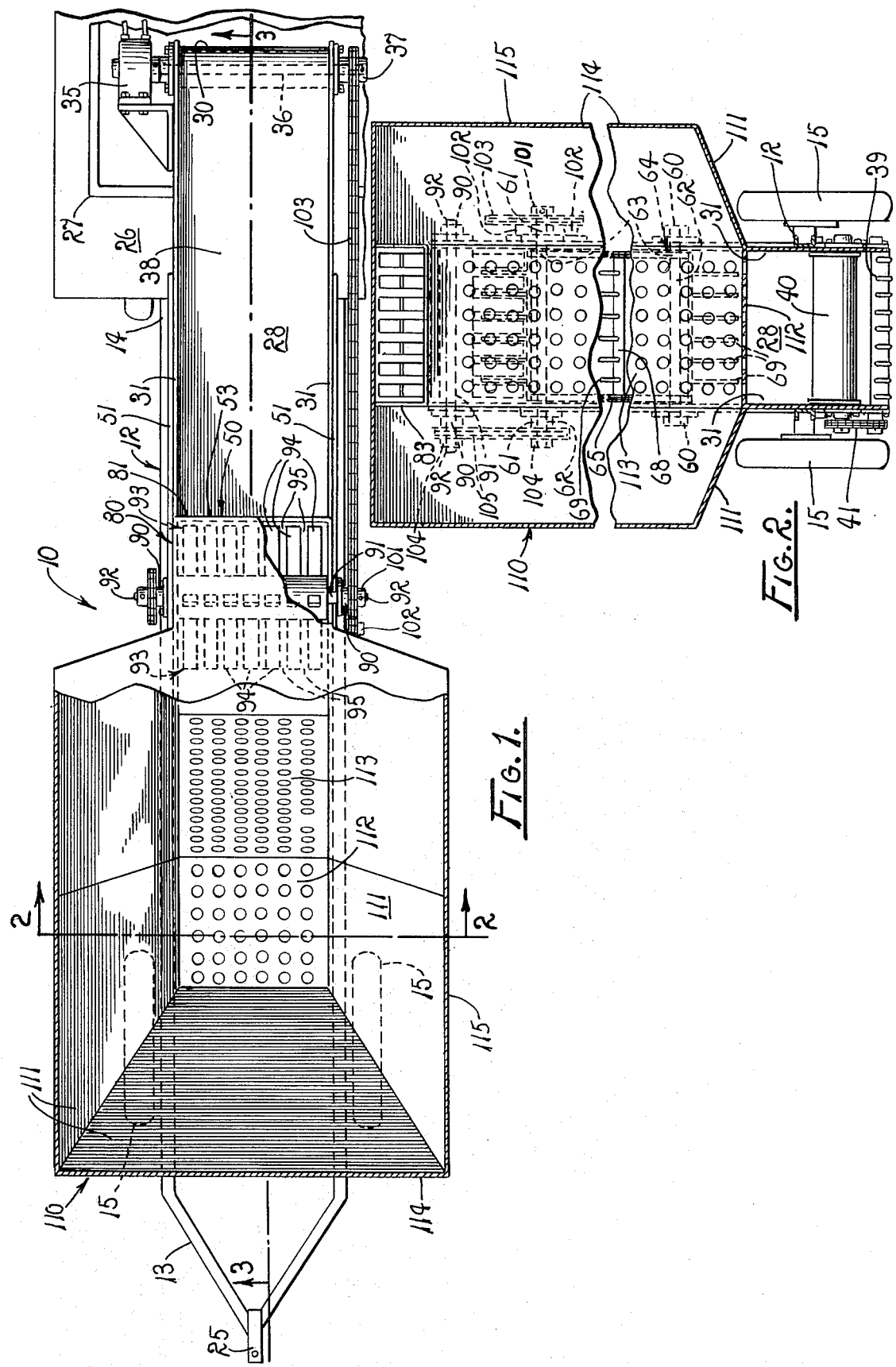

MATERIAL HANDLING APPARATUS

BACKGROUND OF THE INVENTION

The present invention relates to a material handling apparatus and more particularly to such an apparatus which is particularly useful automatically to pick up rolled trays of processed fruit such as raisins and the like on a conveyor, to remove the trays from the conveyor so as to unroll the trays and to discharge the fruit for subsequent processing or boxing and to collect the trays for subsequent disposal or reuse.

The prior art patents such as the Stevenson U.S. Pat. Nos. 1,907,456; 1,907,457; 2,254,550; the Stanley U.S. Pat. No. 2,670,863; the Byington U.S. Pat. No. 2,623,652; and the Gerrans U.S. Pat. No. 3,107,800 relate primarily to handling devices for use in automatically emptying stacks of boxes filled with fruit. The Stanley U.S. Pat. No. 2,670,863 discloses a device adapted for picking up raisins disposed on a continuous tray but it is not operable with commonly used individual trays. These patents, the closest noted in the prior art, are for substantially different purposes and provide structures which are markedly different from the device of the present invention.

In the handling of certain materials, it is frequently necessary to separate containers from their contents on a production line basis. Such handling is quite expensive where it must be manually performed. More specifically in the preparation of dried fruit and particularly raisins, it is common practice to sun dry the fruit in the fields on paper trays subsequent to picking. After each drying and before being picked up, the trays are frequently rolled for curing purposes and to prevent damage to the fruit because of inclement weather conditions.

Agricultural machinery has been devised and employed automatically to pick up the rolled trays of fruit lying in rows in the field. Such devices normally utilize conveyor belts to deliver the rolled trays of fruit to a work platform for boxing as the device moves through the field. Such devices also frequently have been operable automatically to box the fruit once it has been removed from the trays. However, in the past the trays have had to be manually unrolled for the discharge of the fruit prior to boxing. Due to the large numbers of trays that must be unrolled, many laborers have been required adequately to handle the trays delivered to the work platform by the conveyor. The maintenance of such a work force has been inefficient, expensive and cumbersome in operation.

SUMMARY OF THE INVENTION

It is therefore an object of the present invention to provide a material handling apparatus which operates automatically to segregate containers from their contents on a production line basis.

Another object is to provide such an apparatus which is particularly suited to the separation of dried fruit, such as raisins, from drying trays in which they are wrapped as such trays are picked up in the field for boxing.

Another object is to provide such an apparatus which retrieves successive rolled trays of dried fruit from a conveyor, individually unrolls the trays and discharges the dried fruit from each tray for subsequent boxing.

Another object is to provide such an apparatus which successively collects the raisin trays subsequent to discharging of their contents and transfers the trays for collection in a hopper.

Another object is to provide such an apparatus which insures that a minimum amount of the dried fruit will be lost or damaged during and subsequent to separation of the dried fruit from the drying trays.

A further object is to provide such an apparatus which is readily adaptable for mounting on conventional raisin tray retrieving devices and is fully compatible for use therewith.

A still further object is to provide such an apparatus which operates automatically to perform its designed function, thereby eliminating any need for manual assistance during use.

Further objects and advantages are to provide improved elements and arrangements thereof in a device for the purposes described which is dependable, economical, durable and fully effective in accomplishing its intended purposes.

BRIEF DESCRIPTION OF THE DRAWINGS

FIG. 1 is a top plan view of the material handling apparatus of the present invention showing it mounted for operation on a conventional raisin tray collecting device with portions thereof broken away to expose certain operative parts.

FIG. 2 is a fore-shortened, transverse vertical section taken at the position represented by line 2—2 of FIG. 1.

DESCRIPTION OF THE PREFERRED EMBODIMENT

Figure 3:
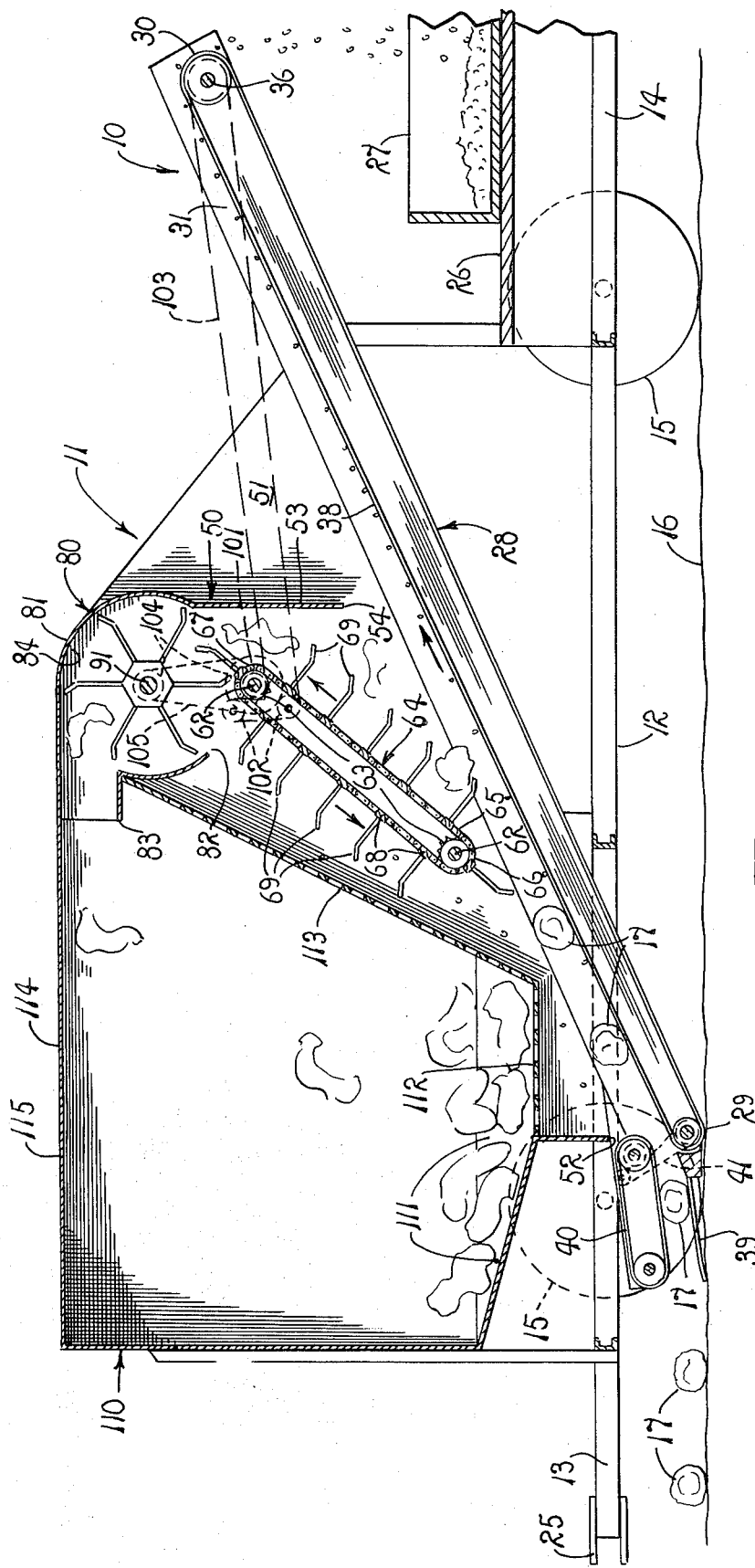
FIG. 3 is a longitudinal vertical section taken at the position represented by line 3—3 of FIG. 1.

Referring more particularly to the drawings, a material handling apparatus embodying the principles of the present invention is generally indicated by the numeral 10. The apparatus is fully adaptable for use in a wide variety of situations on a production line basis successively to discharge the contents of containers supplied to the apparatus. However, the apparatus is primarily designed to be mounted on a conventional conveyor type raisin tray retrieving device 11. Preferably, the apparatus is manufactured as an integral part of the retrieving device. However, it is also capable of being mounted on presently available retrieving devices so as to convert them for use, as herein described.

The retrieving device 11 has an elongated frame 12 providing a forward portion 13 and a rearward portion 14. Four ground wheels 15 are mounted for rotational movement on the frame and support the retrieving device for earth traversing movement along a ground surface 16 having rolled raisin trays 17 disposed thereon in rows, as best shown in FIG. 3.

A hitch 25 is mounted on the forward portion 13 of the frame 12 and adapted for connection to a tractor, not shown, for pulling the retrieving device. A horizontal platform 26 is mounted on the rearward portion 14 of the frame and serves to support sweat boxes 27 thereon, as shown in FIG. 3. A receiving member or conveyor 28 having a forward end 29 and a rearward end 30 is mounted in the frame in rearwardly inclined relation so that the forward end is closely adjacent to the ground surface 16 and the rearward end is positioned in spaced relation to and above the platform in the rearward portion of the frame. The conveyor has upwardly extending sides or skirt boards 31 which extend from the forward to the rearward end of the conveyor.

A drive motor 35 is mounted in the frame 12 adjacent to the rearward end 30 of the conveyor 28 and has a drive shaft 36 extending in driving relation through the rearward end. A sprocket 37 is mounted on the distal end of the shaft on the opposite side of the conveyor from the drive motor, as best shown in FIG. 1. The conveyor has an upper run 38 and is adapted to be driven at a predetermined speed by the drive motor to cause the upper run to move from the forward end to the rearward end of the conveyor. A draper 39 is mounted in the frame at the forward end of the conveyor for sliding movement with the conveyor over the ground surface 16, as best shown in FIG. 3. The draper has an endless belt 40 mounted in the frame in spaced relation to and above the draper. The belt is adapted to be driven through a chain drive 41 off of the forward end of the conveyor so as to motivate successive rolled raisin trays 17 over the draper and onto the forward end of the conveyor.

The material handling apparatus 10 has a housing 50 mounted on the frame 12 of the retrieving device 11 above the conveyor 28 extending from the forward end 29 to approximately the middle of the upper run 38 thereof. The housing has spaced opposite side walls 51 which define an entrance opening 52 adjacent to the draper. A back wall 53 is mounted between the side walls above and approximately midway along the upper run of the conveyor extending downwardly to define an exit opening 54.

A lower pair of bearings 60 are individually mounted in the side walls 51 of the housing 50 so as to define a horizontal axis in predetermined spaced relation to the upper run 38. An upper pair of bearings 61 are individually mounted in the side walls so as to define a horizontal axis in a predetermined position upwardly and rearwardly from the lower pair of bearings. A pair of shafts 62 are extended between the side walls and individually rotationally received in each of the pairs of bearings. Each of the shafts has a pair of sprockets 63 mounted thereon in spaced relation individually adjacent to the side walls within the housing. A belt 64, having endless chains 65, is mounted in driven relation about the shafts with the chains engaging the sprockets. The belt has a lower grasping end 66 and an upper discharge end 67. A plurality of bars 68 are mounted in uniformly spaced relation transversely of the belt and between the chains throughout the entire run of the belt. Each of the bars has a plurality of tines 69 rightangularly mounted therealong and extending outwardly from the belt. The tines are disposed in rows longitudinally of the belt. The distal ends of the tines are adapted to be drawn along a path of travel which closely approaches the upper run of the conveyor at the grasping end of the endless belt, as best shown in FIG. 3, and rearwardly diverge therefrom.

A stripping mechanism or blower 80 is mounted on the housing 50 adjacent to the discharge end 67 of the endless belt 64. The blower has a duct housing 81 which is coextensive with housing 50 and interconnects the side walls 51 and back wall 53 thereof, as best shown in FIG. 3. The housing has an intake opening 82 adjacent to the discharge end of the endless belt and a forwardly extending exhaust port 83. The housing also defines an interior 84.

A pair of blower bearings 90 are individually mounted in the side walls 51 of housing 50 so as to define a horizontal axis extending through the duct housing 81 parallel to the shafts 62. A blower shaft 91 having opposite ends 92 is mounted for rotational movement in the blower bearings with the opposite ends extending to the exterior of the housing on opposite sides of the side walls. A fan 93, having radially extending paddles 94 mounted in rows longitudinally thereon, is mounted on the blower shaft for rotational movement therewith extending between the side walls of the housing. Adjacent paddles of each row define interstices 95 therebetween circumscribing the fan. During rotation, the distal ends of the paddles are caused to travel in a circular path in which they pass closely adjacent to the discharge end 67 of the endless belt 64. During such passage, the tines 69 individually pass through the interstices between the paddles.

A sprocket 101 is mounted on the end of the shaft 62 in the upper pair of bearings 61 on tne end thereof on the side of the apparatus 10 having the sprocket 37. A pair of idler sprockets 102 are mounted for rotational movement in closely adjacent spaced relation to sprocket 100. A first drive chain 103 is extended about sprocket 37 and about the idler sprockets so that it contacts sprocket 101 in driving relation thereto, as best shown in FIG. 3. On operation of the drive motor 35, the conveyor 28 is traveled in a clockwise direction and the endless belt 64 is traveled in a counterclockwise direction, as viewed in FIG. 3, by means of the first drive chain. A pair of sprockets 104 are individually mounted on the opposite end of the same shaft 62 and the corresponding opposite end 92 of the blower shaft 91. A second drive chain 105 extends about the pair of sprockets 104 in driving relation thereto. Thus, during operation of the drive motor, the fan 93 is caused to be rotated in a counterclockwise direction, as viewed in FIG. 3, by means of the second drive chain.

A tray hopper receptacle 110 is mounted on the housing 50 forwardly of and in communication with the exhaust port 83, as best shown in FIG. 3. The receptacle has convergently sloped bottom sides 111, a perforate floor 112, and a perforate back wall 113. The perforate floor and back wall are integral with the housing 50. A cage structure 114 is provided on the receptacle in communication with the bottom sides and back wall of the receptacle so as to form an enclosure 115.

OPERATION

The operation of the described embodiment of the subject invention is believed to be clearly apparent and is briefly summarized at this point. The raisin tray retrieving device 11 having the material handling apparatus 10 of the present invention mounted for operational use thereon, is drawn by a tractor, not shown, in connection with the hitch 25 to the vineyard in which trays are to be retrieved. The device is oriented in longitudinal alignment with a row of rolled raisin trays 17.

Subsequently, the retrieving device 11 is drawn along the row of rolled raisin trays 17 for picking up successive trays in the row in the conventional manner. As can best be seen in FIG. 3, during such movement of the device, the draper 39 at the forward end 29 of the conveyor 28 slides along the ground surface 16 and under each successive tray 17 so as to lift it off of the ground surface. The endless belt 40 is driven through chain drive 41 in a counterclockwise direction, as viewed in FIG. 3, contacting each successive tray and drawing it up the draper and onto the forward end of the conveyor. The trays are carried on the upper run 38 of the conveyor through the entrance opening 52 of the housing 50 toward the grasping end 66 of the endless belt 64.

As a rolled tray 17 approaches the grasping end 66, the distal ends of the tines 69, being carried with the belt 64 in a counterclockwise direction and at a somewhat greater speed than that of the upper run 38 of the conveyor 28, engage the rolled tray passing therealong. The rolled trays are thereby impaled on the tines during continued movement and are subsequently lifted from the upper run of the conveyor borne by the tines. Upon being lifted from the upper run, the weight of the raisins within the rolled trays gravitationally unrolls the trays so as to discharge the raisins gravitationally onto the upper run of the conveyor while the trays remain impaled on the tines. The discharged raisins are subsequently carried on the upper run of the conveyor toward the rearward end 30 thereof and are gravitationally discharged therefrom into a sweat box 27 disposed below the rearward end on the platform 26, as shown in FIG. 3.

Simultaneously, each unrolled tray 17 is borne by the tines 69 along the path of travel of the endless belt 64 divergently from the upper run 38 of the conveyor 28. Upon reaching the discharge end 67 of the endless belt, the rows of paddles 94 of the fan 93 are passed in a meshing relationship through the tines with the tines passing through the interstices 95 of the rows of paddles. Such passage causes the paddles to pull the trays from the tines. The initial impaling of the trays by the tines 69 and their ultimate removal from the tines is facilitated by bending the outer ends of the tines obliquely forwardly in the direction of travel of the tines.

The fan 93 of the blower 80 is rotated in a counterclockwise direction, as viewed in FIG. 3, to create a movement of air from the intake opening 82 through the interior 84 of the blower and subsequently out of the exhaust port 83 thereof. Such movement of air causes the trays 17, which have been removed from the tines 69 of the endless belt 64, to be drawn with the movement of air through the interior of the blower and subsequently to be discharged through the exhaust port. Upon such discharge from the blower, the trays are collected in the tray receptacle 110 for subsequent disposal.

It should be noted that any raisins which were not discharged onto the upper run 38 of the conveyor 28 upon unrolling of the tray 17 are subsequently allowed to be gravitationally deposited on the upper run during continued movement of the tray through the blower 80 and into the receptacle 110. If they are dislodged from the tray while the tray is still within the housing 50, they fall directly onto the upper run through the housing. Raisins which become dislodged from the tray subsequent to discharge of the tray through the exhaust port 83 fall through the perforate floor 112 or perforate back wall 113. Such raisins are then received on the upper run of the conveyor for subsequent discharge into the sweat box 27 with the remainder of the raisins.

The material handling apparatus 10 of the present invention operates automatically without manual assistance to unroll successive rolled raisin trays 17, to discharge the raisins carried in each roll onto the upper run 38 of the conveyor 28 for subsequent automatic boxing, and discharges the trays for collection in a tray receptacle 110. Furthermore, the apparatus operates as a closed system so that waste as a result of raisins being carried with the unrolled trays is precluded.

Although the invention has been herein shown and described in what is conceived to be the most practical and preferred embodiment, it is recognized that departures may be made therefrom within the scope of the invention, which is not to be limited to the illustrative details disclosed.

Having described my invention, what I claim as new and desire to secure by Letters Patent is:

1. A material handling apparatus for emptying the contents of rolled trays of fruit borne by a conveyor comprising a frame mounted in operable association with the conveyor; an endless belt, having opposite grasping and discharge ends, mounted in the frame with its grasping end above the conveyor and the belt defining a path of travel divergent from the conveyor; a plurality of tray engaging tines mounted on and extending from the belt so as to define a path of travel reaching in close proximity to the conveyor; a stripping mechanism mounted in the frame adjacent to the discharge end of the belt; and power means mounted in the frame adapted to drive the belt and the stripping mechanism to impale successive trays on the tines, discharge the contents of the trays onto the conveyor for subsequent processing, and strip the trays from the tines.

2. The apparatus of claim 1 in which the stripping mechanism has a duct for transfer of the trays from the mechanism for disposal.

3. The apparatus of claim 2 in which the stripping mechanism includes a fan, mounted in the frame between the discharge end of the belt and the duct, which is operable to draw trays from engagament on the tines and to blow said trays through the duct for disposal.

4. The apparatus of claim 3 in which the fan has paddles which pass between the tines during operation individually to strip trays from the tines.

5. The apparatus of claim 4 in which a receptacle having a perforate floor is mounted at the remote end of the duct above the conveyor and is adapted to receive the trays from the duct and to allow gravitational discharge of any remaining fruit through the perforate floor for receipt on the conveyor.

6. A material handling apparatus for picking up rolled trays of cured raisins, unrolling the trays to discharge the raisins for boxing, and collecting the used trays, comprising an inclined conveyor, having opposite forward and rearward portions, mounted for earth traversing movement along a row of rolled trays of cured raisins in substantial alignment therewith; a receiving platform mounted below the rearward portion of the conveyor for supporting boxes to receive cured raisins; an endless belt, having opposite grasping and discharge ends and a lower run, mounted above the conveyor so that the grasping end is in adjacent spaced relation to the conveyor and the lower run extends rearwardly from the grasping end toward the discharge end and upwardly divergently from the conveyor; a plurality of tines mounted on and extending outwardly from the belt in rows extended longitudinally of the belt; a stripping mechanism mounted adjacent to the discharge end of the belt; and power means adapted to drive the conveyor, belt and mechanism so that rolled trays are successively picked up from the row by the conveyor, impaled on tines, elevated from the conveyor on the tines by the belt so as gravitationally to be unrolled to discharge the raisins therefrom onto the conveyor for subsequent discharge from the rearward portion of the conveyor for boxing, and stripped from the tines by the stripping mechanism.

7. The apparatus of claim 6 in which a receptacle, having a perforate floor, is mounted on the stripping mechanism in operable connection with the conveyor so that raisins not discharged from the trays prior to stripping are gravitationally discharged through the perforate floor for receipt by the conveyor.

8. The apparatus of claim 7 in which the stripping mechanism includes a fan having paddles which are operable to pass between the rows of tines to strip the trays therefrom and to blow the trays into the receptacle.

9. A material handling apparatus for separating releasable containers, borne by a means of conveyance, from their contents, the apparatus comprising a driven member mounted above the means of conveyance and having an orbital path of travel from a position adjacent to and above the means of conveyance to a position remote from and above said means of conveyance; container grasping means secured on the member; means for powering the member to grasp successive containers from the means of conveyance and carry said containers from the adjacent position to the remote position gravitationally to discharge their contents onto the means of conveyance; and a container stripping mechanism mounted adjacent to the remote position of the member to remove the containers from the grasping means carried thereto by said member, the stripping mechanism including a vacuum fan mounted adjacent to the remote position of the member.

* * * * *

UNITED STATES PATENT OFFICE
CERTIFICATE OF CORRECTION

Patent No. 3,795,335      Dated March 5, 1974

Inventor(s)     Bobbie F. Hansen, Jr.

It is certified that error appears in the above-identified patent and that said Letters Patent are hereby corrected as shown below:

<u>In the Specification</u>:

Column 1, line 34 before "drying", delete "each" and insert ---such---.

Column 4, line 22 after "on" and before "end" delete "tne" and insert ---the---.

Signed and sealed this 2nd day of July 1974.

(SEAL)
Attest:

EDWARD M. FLETCHER, JR.      C. MARSHALL DANN
Attesting Officer      Commissioner of Patents